E. PARKER.
Stovepipe Damper.
No. 55,017. Patented May 22, 1866.
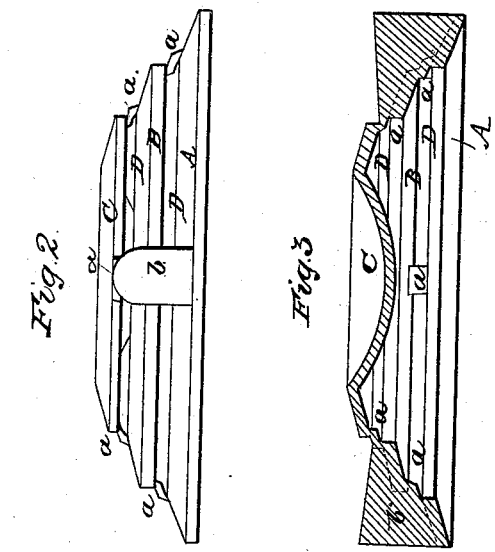
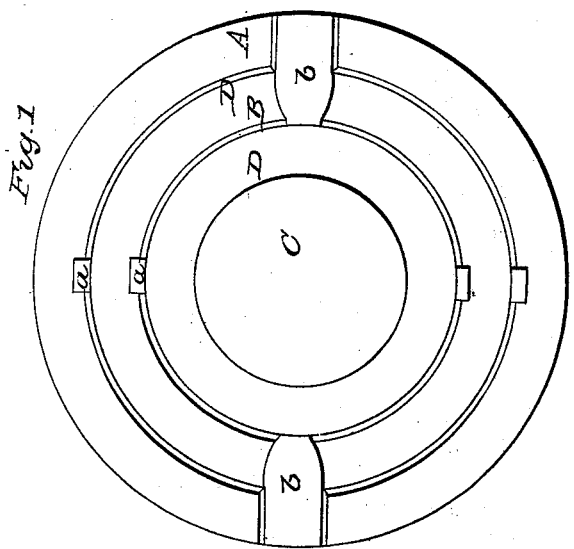
Witnesses
Frederick Curtis
J. B. Hale Jr.
Inventor
Ephraim Parker
by his attorney
R. H. Eddy

UNITED STATES PATENT OFFICE.

EPHRAIM PARKER, OF MARLOW, NEW HAMPSHIRE, ASSIGNOR TO ALFRED A. PARKER, OF ORANGE, MASSACHUSETTS.

STOVE-PIPE DAMPER.

Specification forming part of Letters Patent No. 55,017, dated May 22, 1866.

*To all whom it may concern:*

Be it known that I, EPHRAIM PARKER, of Marlow, of the county of Cheshire and State of New Hampshire, have invented an Improved Damper or Heat-Regulator for Smoke-Pipes; and I do hereby declare the same to be fully described in the following specification and represented in the accompanying drawings, of which—

Figure 1 is an elevation, Fig. 2 a side view, and Fig. 3 a transverse section, of it.

The article in question consists of a disk and a series of flat or concavo-convex annuli, arranged with annular openings between them, and in other respects substantially as hereinafter described, the disk being either a plain or concavo-convex one. When concavo-convex, and arranged with its convexity projecting into the space between all the annuli, such disk is in an excellent condition for counterbalancing them, or effecting the even balancing of the whole damper on its journals.

In the drawings, A and B denote the rings or annuli, while C is the disk, which is exhibited as being concavo-convex. The disk and rings are arranged one above the other in a flat conic frustum, as it were, so that there may be spaces or openings D D between them, the whole being as represented in the drawings. The said disk and rings are joined together by connections *a a* and by two lugs, *b b*, arranged as shown in the drawings. These lugs serve as means of supporting the damper within a smoke-pipe, and they are to have journals extended from them, to go through the pipe in opposite directions and take a bearing therein. The lugs may be extended so as to bear with friction against opposite sides or parts of the interior surface of the pipe, in order that the damper by such friction may be held in position when arranged at any desirable inclination, either horizontally or vertically, in the pipe. The diameter of the disk varys little from the inner diameter of the ring next to it, so the outer diameter of the said ring differs little from the inner diameter of the next ring.

By the arrangement of the rings and disk the whole damper becomes a concavo-convex frustum, having annular, or partially annular, openings through it for the smoke to course through, the rings and such openings being so arranged as to cause the smoke to be discharged radially against the inner surface of the pipe, whereby the pipe will be heated to better advantage for radiating heat than it would be were the damper made flat with openings running through it transversely.

When the damper is so turned or made to stand in the pipe that the smoke in going through the pipe will impinge against the convex side of the said damper, or, in other words, against the concave face of the disk, such smoke, in going through the damper, will be driven inward toward the axis of it, so as not to heat the sides of the pipe so much as it would were the damper reversed. Therefore with this damper we gain all the necessary draft when it is closed and still employ the remaining waste smoke to good advantage in heating the smoke-pipe.

I make no claim to the dampers as represented in the United States Patents 34,925 and 49,899, my damper being an improved arrangement of a disk and one or more rings.

I claim—

1. The above-described arrangement of annuli A B and a concavo-convex disk, C, namely, in a conic frustum and with the convexity of the disk extending within the damper in manner and for the purpose as specified.

2. The damper as made with the series of annuli and the disk arranged in a conic frustum, and with each ring or annulus concavo-convex, as set forth.

EPHRAIM PARKER.

Witnesses:
R. H. EDDY,
F. P. HALE, Jr.